United States Patent
Malmstrom et al.

(10) Patent No.: US 6,937,844 B2
(45) Date of Patent: Aug. 30, 2005

(54) METHODS AND ARRANGEMENTS FOR SHORT RANGE WIRELESS COMMUNICATION

(75) Inventors: Jonas Malmstrom, Uppsala (SE); Johan Wennerberg, Uppsala (SE); Marcus Jonsson, Uppsala (SE)

(73) Assignee: Wireless Lab Sweden AB, Uppsala (SE)

( * ) Notice: Subject to any disclaimer, the term of this patent is extended or adjusted under 35 U.S.C. 154(b) by 419 days.

(21) Appl. No.: 10/156,826

(22) Filed: May 30, 2002

(65) Prior Publication Data

US 2004/0198219 A1 Oct. 7, 2004

(51) Int. Cl.[7] .................................................. H04B 5/00
(52) U.S. Cl. ........................................ 455/41.2; 710/2
(58) Field of Search .............................. 455/41.2, 41.3; 710/2, 5

(56) References Cited

FOREIGN PATENT DOCUMENTS

JP          05-145980   *   6/1993   ............ H04Q/9/14

OTHER PUBLICATIONS

Castano et al. Wireless IEEE 488.2 Test Systems Based on Bluetooth, 2003 IEEE, pp. 518–526.*

Betancor et al. IEEE–488.2 Communications by Infrared Wireless Link, 1992 IEEE, pp. 500–504.*

* cited by examiner

*Primary Examiner*—Lee Nguyen
(74) *Attorney, Agent, or Firm*—Young & Thompson

(57) ABSTRACT

The present invention relates to a arrangement and method for providing wireless communication between GPIB devices and a host computer. An GPIB adapter (100) according to the present invention provides wireless communication between a GPIB device (200) and a computer (120), the adapter comprises a command handle (140)r adapted for communication with a wireless communication module (130). The adapter further comprises a GPIB control unit (150) and the command handler is adapted for executing GPIB function calls directed to a GPIB device through the GPIB control unit (150). The command handler comprises a GPIB driver (344) which is adapted for communication with the GPIB control unit (150). The arrangement makes it possible for the adapter to provide complete GPIB functionality.

20 Claims, 5 Drawing Sheets

METHODS AND ARRANGEMENTS FOR SHORT RANGE WIRELESS COMMUNICATION

FIELD OF THE INVENTION

The present invention relates generally to the field of short-range wireless communication and particularly to communication between pieces of equipment utilizing the GPIB (General Purpose Interface Bus) communication methods.

BACKGROUND OF THE INVENTION

One of the most used means of communication between instruments and computers in laboratory environment is the GPIB and the associated GPIB protocol. It has found its use in research laboratories and industrial production as well as in clinical applications. A typical setup utilizing GPIB comprises a number of measurement devices e.g. Digital Multimeters (DMM:s) supply devices such as power supplies, control and transport devices e.g. switches and stepping motors, and computers for controlling measurement processes and collecting and analyzing data. The GPIB connects these GPIB devices together and is used for transferring both device instructions (commands) and data.

The GPIB was developed during the 1970s by Hewlett-Packard. It was accepted as an open standard, ANSI/IEEE Std. 488-1978, by IEEE (The Institute of Electrical and Electronics Engineers, Inc.) in 1978. The latest version is defined in ANSI/IEEE Std 488.1-1987 and IEEE Std 488.2-1992. GPIB is a parallel communication protocol supporting up to 15 GPIB devices, including at least one GPIB controller, that can be connected to one bus and controlled by a host computer. Data is sent in parallel 8 bits (1 byte) at a time with a maximum data transfer rate of 1 Mbyte/s (8 Mbit/s). According to the standard, GPIB cables may be of any length up to 4 meters. However, long cables lead to significantly lower transfer rates. To achieve the maximum transfer rate interconnecting cable links should be as short as possible with an average cable length between devices being less than one meter and with a maximum of 15 m total length per bus.

During operation a user application program, typically developed in LabView or C++, residing in a host computer, controls the connected GPIB devices as well as collects and stores measurement data through a GPIB interface. In addition, the user application frequently processes the data and presents it in graphical form. The GPIB interface consists of a GPIB controller device (hardware) and a device driver (software). The GPIB control device is typically designed as a PCI or ISA expansion card that is put into a free slot in the host computer, GPIB controllers are also available as "plug-ins" adapted for external ports such as the USB port. The device driver provides an Application Program Interface (API) that enables the application programs to send and receive device data, and send bus and device instructions to the GPIB bus via the GPIB controller device by calling GPIB functions in the device driver.

Well-recognized problems with using GPIB arise from the above-mentioned inherent limitations on maximum total cable length and the maximum average length between devices and the fact that cables are needed. All pieces of equipment must be placed close together resulting in obvious drawbacks. It is often a requirement, from measurement constrains, to place parts of the equipment in close proximity to other parts or to the measurement object. For example a high accuracy current meter should preferably be placed close to the measurement object in order to keep the signal cables short. The limitations in the GPIB cubic length forces all the rest of the equipment to be placed nearby, which may be unwanted both of measurement aspect and by the aspects of convenient handling. In other applications part of the equipment need to be separated from the rest, for example in "glove boxes" or vacuum chambers or in clinical use. The may be impossible to arrange, and if possible, often with great difficulties and cumbersome handling as a result.

In addition the cables are rather bulky and stiff. In order to ensure the communication the cables need to be secured to the devices with screws. This, and the stiffness of the cables, makes the system inflexible and the GPIB contribute to the often massive entanglement of cables found in measurement setups. The lack flexibility is manifested in that it is cumbersome and time-consuming to change or replace a piece of equipment. Due to the inflexibility it is often impractical to use a device in more than one measurement setup, even if that device is not in constant use in that setup, adding to the cost of the measurement setups.

The above-described limitations of the GPIB often result in a setup arranged to satisfy the GPIB requirements and not in a way that is the best from a measurement or a handling perspective. Often found in laboratories are GPIB cables hanging in the air to make them as short as possible, such hanging cables being a potential hazard both for personnel and to the equipment. Importantly, certain applications cannot utilize the advantages of the GPIB due to its physical constrains and other means of communication have to be chosen.

Furthermore the cable, physically connecting the measurement devices, may cause grounding problems or transmit and/or pick up unwanted signals. This can be a severe problem in sensitive measurement application with low signal to noise ratio.

The problems arising from the use of cables for the GPIB communication can be summarized in: inflexibility; not possible to electrically separate different units; limitations in range, difficult and costly to construct inlets in for example glove boxes and potential hazards from hanging cables.

A common way to address the problems outlined above is to deliberately or undeliberately violate the constraints on total bus length and average cable length between GPIB devices, an approach that sometimes work but can introduce transmission errors that are unacceptable in for example industrial or clinical applications. Extenders and expanders that can relieve these constraints are commercially available, for example from National Instruments, GPIB extenders effectively replace one, or part of one, GPIB cable with a communication over a different medium, e.g. fiber optics while the GPIB expanders combines two busses into one bus of double size. The GPIB extenders and expanders address some of the described drawbacks of the GPIB, but not the lack of flexibility and the cumbersome handling. On the contrary, the introduction of more units and different means of communication often complicates the measurement setup.

Another approach to relieve the limitations of GPIB is represented by the product GPIB-ENET/100 by National Instruments. This device makes it possible to control GPIB devices through an Ethernet base TCP/IP network, for example a local area network (LAN), which typically is already present in most laboratories, offices and industries. If combined with a W-LAN (Wireless LAN) router the communication with the GPIB-ENET/100 can be made wireless. However, this kind of wireless GPIB interface is inherently costly due to its high degree of complexity and the components needed for its realization. Furthermore, it is space consuming in cases when several GPIB devices are to be provided with one wireless interfaces each.

SUMMARY OF THE INVENTION

The objective problem is to provide a flexible and versatile GPIB based communication system. In particular to avoid the limitations set by the maximum allowed cable length and by the limitations associated with the use of cables.

The problem is solved by the apparatus as defined in claim 1, the system as defined in claim 10, the method as defined in claims 15 and 16 and the computer program product as defined in claims 17 and 19.

The GPIB adapter according to the present invention provides wireless communication between at least one GPIB device and at least one computer, the adapter comprises a command handler adapted for communication with a wireless communication module. The adapter further comprises a GPIB control unit and the command handler is adapted for executing GPIB function calls directed to a GPIB device through the GPIB control unit. The command handler comprises a GPIB driver which is adapted for communication with the GPIB control unit. The arrangement makes it possible for the adapter to provide complete GPIB functionality.

The system according to one embodiment of the invention for comprises at least one adapter comprising a wireless communication module and a command handler, and a computer comprising a wireless communication, and is adapted for executing a user application. A adapter driver in the computer is arranged in communication with the user application and said wireless communication module of the computer and a logical interface is provided between the adapter driver and the command handler of the adapter.

The method, according to one embodiment of the invention, which method is executed in one adapter, comprises the steps of checking for incoming function calls from a wireless communication module, receiving a GPIB Packet comprising the parameters of a GPIB function call, identifying the GPIB function call by the use of a stored list of GPIB function calls and their corresponding GPIB packet structures and function call number, calling the identified function in GPIB driver, assembling the result from the function call in a GPIB return packet, and transmitting the result in the format of GPIB packets via the wireless communication module.

One advantage afforded by the arrangement and method according to the invention is that a flexible GPIB communication is provide and thus overcoming the drawbacks of using GPIB-cables, cables. In particular the limitations set by the maximum allowed cable length are avoided.

Another advantage afforded by the invention is that by providing complete GPIB functionality in the adapter, the amount of information wirelessly transmitted can be significantly reduced.

BRIEF DESCRIPTION OF THE FIGURES

The features and advantages of the present invention outlined above are described more fully below in the detailed description in conjunction with the drawings where like reference numerals refer to like elements throughout, in which.

DETAILED DESCRIPTION OF THE INVENTION

Embodiments of the invention will now be described with reference to the figures.

Figure 1:
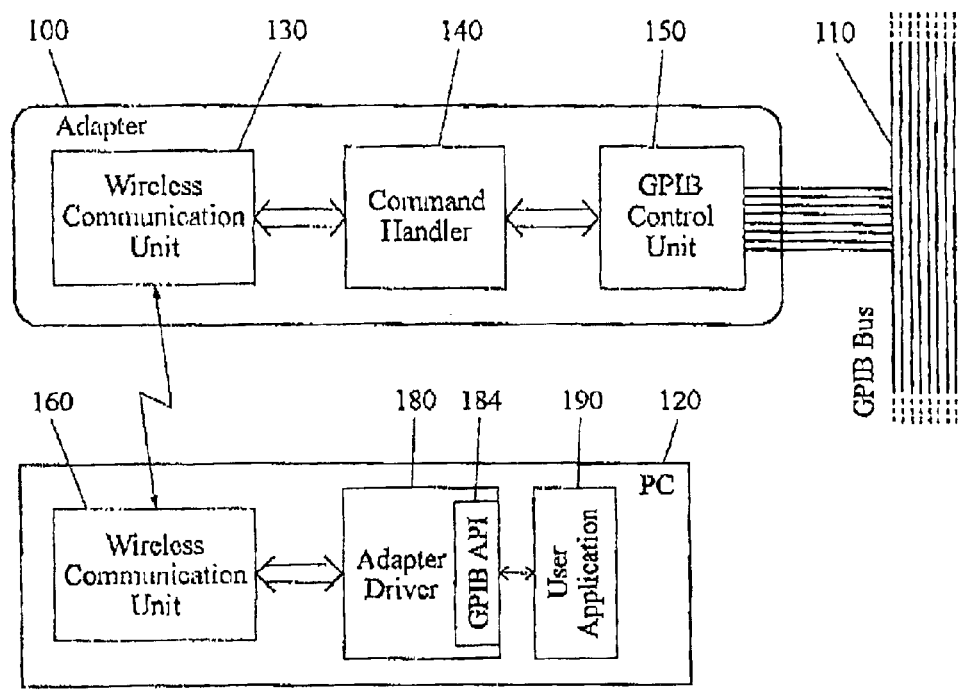
FIG. 1 is a schematic drawing of the main functional parts of the invention.

The main functional parts of the present invention will be described with reference to FIG. 1, in which a user application 190 executing in a host computer (PC) 120 can wirelessly control and communicate with GPIB devices connected to the GPIB bus 110 through an adapter 100. The adapter comprises an adapter wireless communication unit 130, a command handler 140, and a GPIB control unit 150. The computer 120 is provided with a computer wireless communication unit 160 and an adapter driver 180, which typically is a software module. The adapter 100, the computer wireless communication unit 160 and the adapter driver 180 provide a wireless GPIB interface to the user application 190.

The command handler 140 performs a key function by accepting GPIB function calls that are sent from the host computer 120 to the adapter 100 and executing them through the GPIB control unit 150. The function calls are issued by the user application 190 and adapted for wireless transmission by the adapter driver 180. The command handler 140 also manages the wireless transmission of information from the adapter 100 to the host computer 120. The parts and functions of the command handler 140 will be further described below.

One important consideration in the realization of the invention is the choice of wireless technology. There are several technologies available on the market, e.g. IrDA (infrared light). Bluetooth (2.4 GHz RF) and W-LAN (e.g. IEEE Std 802.11b, 2.4 GHz RF). Bluetooth is currently the preferred implementation technology, but this choice should not be regarded as limiting to the scope of the invention. On the contrary, as appreciated by the skilled in the art, all of the above-mentioned technologies as well as other present and future means of wireless transmission may advantageously be utilized in the device and method according to the invention. In the following Bluetooth is used as an example. Only parts of the Bluetooth technology directly relevant for the present invention will be described. A complete description of Bluetooth may be found in the Specification of the Bluetooth System Version 1.1, Feb. 22, 2001.

The adapter driver 180 residing in the host computer 120 should have a standard compatible API, denoted GPIB API 185, in order to avoid modifications of the user application programs. A suitable interface is National Instrument's NI-488.2 API, which has become a de facto industry standard.

Figures 2A, 2B:
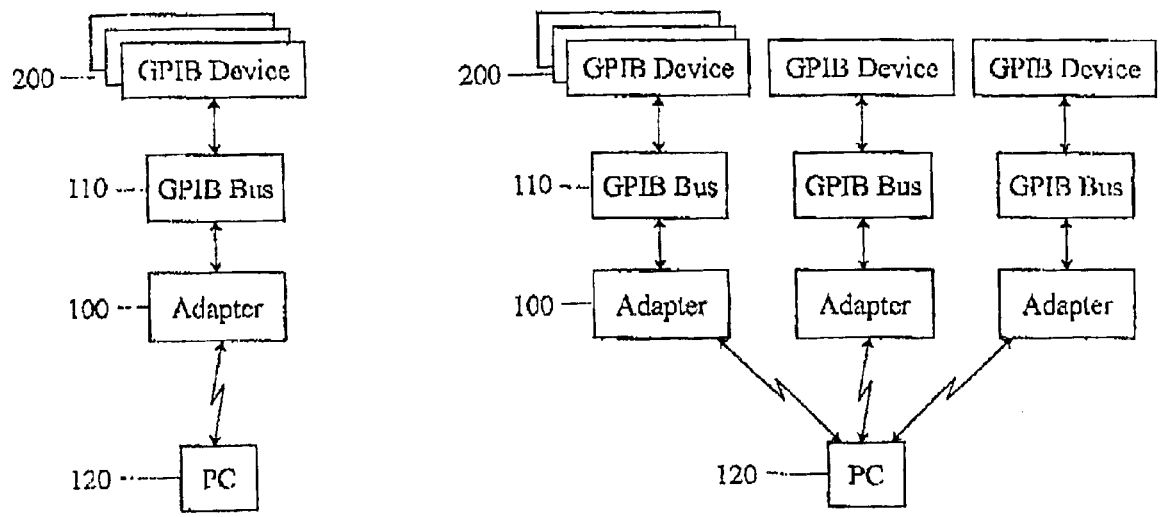
FIG. 2 shows two basic usage modes for the invention.

FIG. 2 illustrates schematically two basic usages of the invention. The measurement system depicted in FIG. 2a comprises a host computer 120 provided with a computer wireless communication unit 160 and an adapter driver 180 and executing a user application 190, an adapter 100, and a GPIB bus 110 to which up to 14 additional GPIB devices 200 may be connected. The user application may address each GPIB device 200 separately through the GPIB bus 110. The system shown in FIG. 2b comprises a host computer 120 and a multitude of adapters 100, and one GPIB bus 110 per adapter. The computer wireless communication unit 180 and the adapter driver 190 have the capability of establishing and maintaining communication with more than one adapter 100. With the Bluetooth technology, a master unit in the computer wireless communication unit 160 may communicate with up to 7 active slave units and up to 255 parked slave units, i.e. up to 255 adapters 100. Each adapter 100 controls a GPIB bus 110 adapted for communication with up to 14 GPIB devices 200. This illustrates the advantage afforded by the invention of being able to control more than 14 GPIB devices from one host computer without costly bus expanders or extenders.

The allowed distance between the computer wireless communication unit 180 and the adapter 100 will be defined by the chosen transmission technology. Standard Class 3 (1 mW) Bluetooth modules have a typical range of 10 meters while the Class 1 (100 mW) modules have a range of 100 meters. Thus, the Bluetooth technology provides means for overcoming the limitations in range of the cable-bound GPIB as well as the other problems associated the use of cables.

The wireless communication can be directed to a network, e.g. Internet, access point instead of to the computer 120. This enables communication between any computer connected to that network and the GPIB devices connected to the adapter(s).

A preferred embodiment of the invention will now be described with reference to the schematic illustrations of FIG. 3 and FIG. 4. The wireless communication unit 130 is in FIG. 3 realized by a Bluetooth module 330, hereinafter referred to as the adapter Bluetooth module 330, available from e.g. Cambridge Silicon Radio (CSR) or Ericsson. The command handler 140 is realized by a microcontroller 340 running a main program 346, a Bluetooth software interface 342 and a GPIB driver 344.

The microcontroller can be a software controlled ARM7 based microcontroller available from e.g. ATMEL. The GPIB control unit 150 is preferably realized by a commercially available GPIB chip 350 from e.g. Ines or National Instruments. The GPIB chip 350 controls and monitors the GPIB bus lines. This includes the signalling on the GPIB control lines required to send and receive single bytes on the bus, as well as detecting and signalling the end of transfers.

The host computer 120 is provided with a computer Bluetooth module 360 and an adapter driver 380. The Bluetooth modules provide a wireless serial interface between the host computer 120 and the adapter 100 through the RFCOMM protocol and the Serial Port Profile (SPP) suitable for this application. The computer Bluetooth module 360 can be any built-in or peripheral commercially available Bluetooth module fulfilling the Serial Port Profile of the Bluetooth specification. The adapter driver comprises a Bluetooth software interface 382 and a GPIB API 384. The GPIB API 384 defines the software interface between the user application 190 and the adapter driver 380. The computer Bluetooth hardware interface 365 can be provided through e.g. USB.

Figure 3:
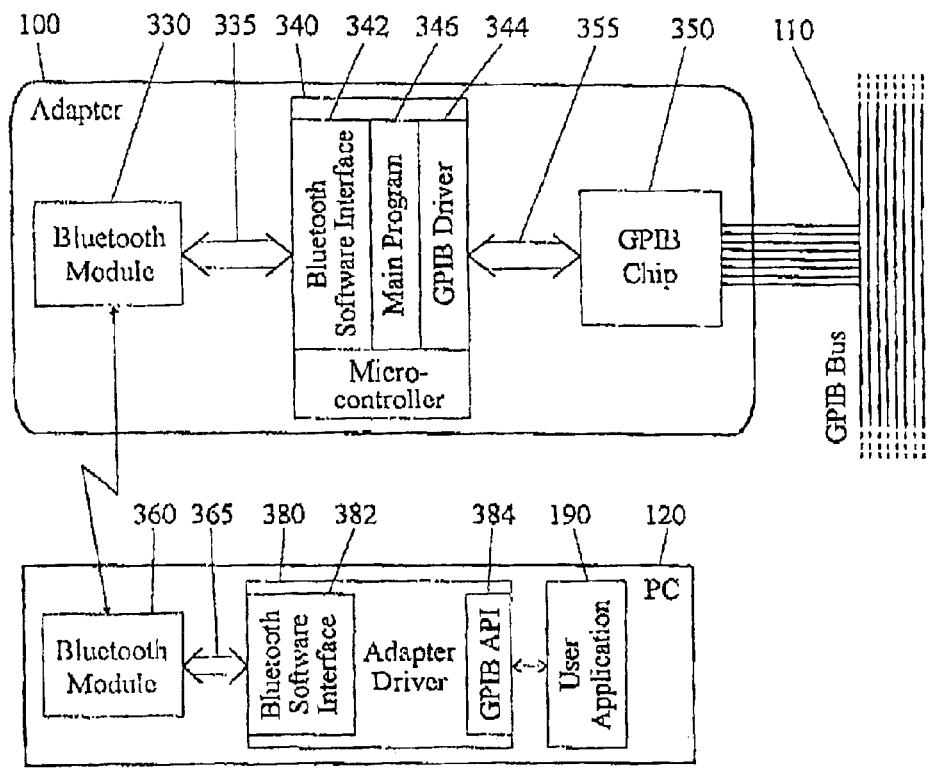
FIG. 3 shows an overview of the system components in the preferred embodiment of the invention.
Figure 4:
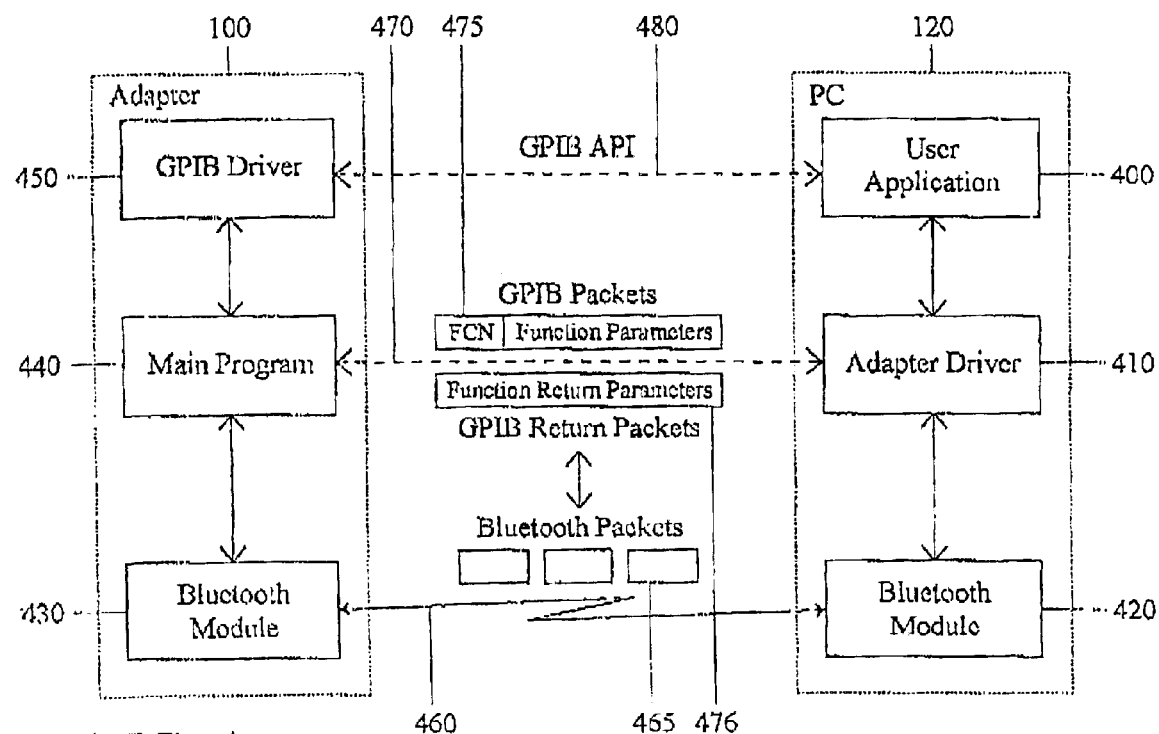
FIG. 4 is a schematic drawing of different logical levels of the communication.

As with arrows indicated in FIG. 3, the adapter 100 comprises two main hardware interfaces. The Bluetooth hardware interface 335 is a serial interface between the Bluetooth module and the microcontroller, provided through UART or USB. To get as high transfer rate as possible it is important that this interface does not limit the transfer rate of the system. The GPIB hardware interface 355 consists of general-purpose IO pins that are needed to access the GPIB chip 350.

The microcontroller 340 comprises preferably a complete GPIB driver 344, By including a complete GPIB driver in the adapter the overhead in the wireless data communication can be significantly reduced, and the limited Bluetooth data transfer rate is thereby better utilized. Hereby, GPIB control commands such as talk/listener assignment before IO operations, interrupt and timer handling are managed by the adapter 100 rather than by the adapter driver 380 in the host computer 120. The requirements on the microcontroller 340 regarding memory and processing capacity are thus increased, but not unacceptably neither from a technological nor a cost perspective. To implement a complete GPIB driver in the adapter also makes it possible to design a more compact adapter driver 380, suitable for applications in small embedded systems such as PDA:s or even mobile phones and thus allows access to GPIB instruments from such devices. The term "complete GPIB driver" should here be interpreted as a GPIB driver cable of handling all or a selection of the GPIB functionality.

Preferably, the GPIB driver 344 supports all the functionality specified in the standard (currently IEEE Standard 488.2). Alternatively, a selection of essential and/or often used functions are included in the GPIB driver 344 and less frequently used functions can be handled from the adapter driver 380 of the host computer 120.

In order to make the adapter compatible with common software it is preferred to provide the GPIB driver 344 with a standard GPIB controller function call API such as the above-mentioned NI-488.2. This makes it easier to implement the adapter driver 380 with a standard compatible API, making the invention appear as a standard GPIB interface in the host computer 120. The adapter driver 380 residing in the host computer 120 can be regarded as an extension of the GPIB driver 344 in the adapter 100.

The upper layers of the Bluetooth software stack may be implemented either in the adapter Bluetooth module 330 or in the Bluetooth software interface 342 of the host microcontroller 340. In the latter case the host microcontroller software communicates with the Bluetooth module via a Host Controller Interface as described in the Bluetooth specification. In the first case it uses a vendor specific API, since there is yet no standardized API for Bluetooth modules with integrated stack. In both cases the Bluetooth software interface 342 appears as a virtual serial port to the main program 346, as will the Bluetooth part to the GPIB part of the adapter driver 380.

An essential functionality of the present invention is that the adapter driver 380 transforms the GPIB function call parameters to data in a format suitable for transmitting with a wireless protocol such as Bluetooth. For Bluetooth, two main factors should be considered in the transformation; the limited wireless transmission rate, and the fact that GPIB provides parallel data transfer while the Bluetooth protocol is serial. In a preferred embodiment of the invention the transformation is realized by the introduction of GPIB packets.

The GPIB packets according to the invention will be described with reference to FIG. 4 and FIG. 5. On the highest level the chosen GPIB API 480 constitutes an interface between the user application 400 and the GPIB driver 450 of the adapter. On the lower levels of communication, the Bluetooth link 460 provides reliable data transmission, including e.g. error checking for the wireless transmission. The introduction of GPIB packets can be seen as a creation of an intermediate logical interface 470 between the adapter driver 410 and the main program 440 of the command handler 140. The logical interface 470 is defined by a packet structure determined by the information needed for a particular function call. Each class of functions is matched by an appropriate GPIB packet structure. The adapter driver 410 is responsible for the creation of GPIB packets 475. The main program 440 of the adapter is adapted for receiving the GPIB packets as well as packaging the information to be transmitted wirelessly from the adapter 100 to the computer 120 in GPIB return packets 476 The use of GPIB packets and the GPIB return packets provides means for optimizing, with respect to the amount of data, the transmission between the computer 120 and the adapter 100, regardless of the chosen transmission technology.

Figure 5A:
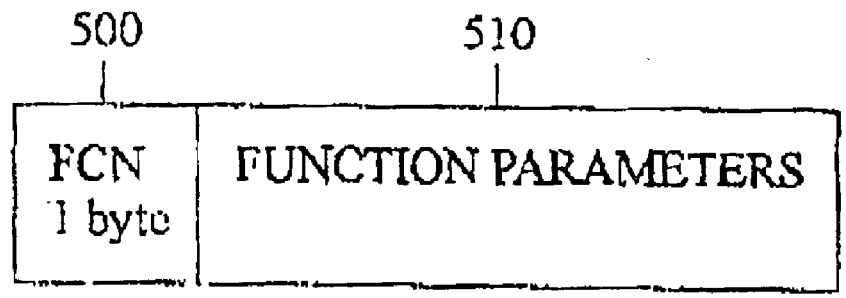
FIG. 5 illustrates the structure of the GPIB packets of the present invention.

The general structure of a GPIB packet 475 is illustrated in FIG. 5a). A first section comprises a one-byte function call number FCN 500, identifying the function call and the corresponding packet structure. The GPIB packet further comprises one or more sections with the parameters of the function call 510. The structure of each type of GPIB packet 475 is adapted to the corresponding GPIP Function calls ensuring that only the necessary data is transmitted. If only a single common packet structure was utilized, it would have to be designed for the function call with the most extensive list of parameters. By using different packet structures optimized for each function call the overhead in the wireless communication is minimized. A list of the most common GPIB function calls and their corresponding GPIB packet structures is found in Appendix A. The GPIB return packets 476 do not have to include the function call number FCN since the function number and therefore the packet structure is known beforehand by the receiving adapter driver 410.

Figure 5B:
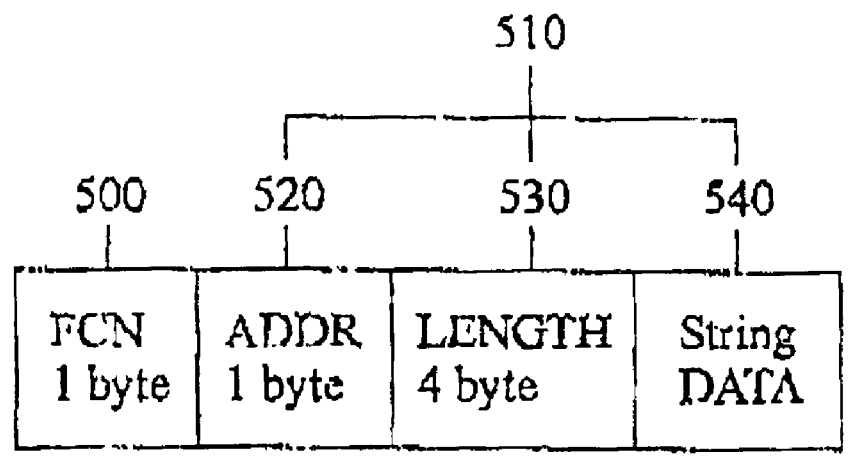

As an example the structure of a GPIB packet 475 corresponding to the GPIB "write" function call, is illustrated in FIG. 5b). The first section, FCN 500, identifies the GPIB "write" function call. The second section ADDR 520 (1 byte) contains the address of the GPIB device. In the case of FIG. 2b with several adapters 100 and GPIB buses 110 the packet structure remains the same since the user application 190 sends parameters identifying both the bus of the individual adapter 100 and the device address. The third section LENGTH 530 contains the length of the write string and is used to identify the end of the packet. A fourth section DATA 540 carries the data to be written to the addressed GPIB devices.

A list of the GPIB function calls and their corresponding GPIB packet and GPIB return packet structures and function call number FCN is stored in the host computer 120 and called upon by the adapter driver 380 in transforming the GPIB function calls issued by the user application 190. Similarly the list is used to transform GPIB return packets 476 received from the adapter to the format understandable for the user application. A corresponding list of the GPIB function calls and their corresponding GPIB packet structures and function call number FCN is stored in memory means accessible from the main program 346 of the microcontroller 340 of the adapter 100. The list of the adapter is, in analogy with the list of the host computer, used for the transformation from the GPIB packets to/from GPIB function calls performed by the main program 346.

On the lower level of communication the simplest and most general form of Bluetooth link 460 for data transfer between two hosts is established using the Serial Port Profile (SPP) detailed in the Bluetooth specification. The SPP relies on the RFCOMM protocol that emulates a serial cable attached between the hosts and provides a vendor independent interface. The Bluetooth stack software implementing the SPP of the Bluetooth modules 420 and 430 handles e.g. error checking and division of the GPIB packets into possible smaller Bluetooth packets 465. With a SPP virtual serial port the data read by the main program 440 and the adapter driver 410 will only be a stream of characters without structure. This calls for the need to identify the end of the GPIB packets. Two different approaches to this problem are recognized: Either the header specifies the length of the packet, or there is an END character identifying the end of the packet. The first approach is possible to use for all packet structures of constant size like GPIB_Address and GPIB_Return_Status (see Appendix A). It is also possible for packets with a size that is variable but known before it is sent to the virtual serial port, which is the case for GPIB_Write and GPIB_Command.

When reading data from a GPIB device through the adapter, the user application specifies the maximum amount of data to be read. The end of the read operation is triggered either because the maximum amount of bytes to be read has been reached, or the device signals and of transfer. Thus the length of the GPIB_Return_Read packet is not known beforehand and it would be necessary to temporarily store the whole string of data, which may be hundreds of kilobytes, in order to calculate it. This is a drawback since memory resources are limited and costly. A better solution is to send batches of data to the computer while the GPIB device is performing the actual read operation and mark the end of the GPIB_Return_Read packet with a special character. Dividing the result data of a read operation into batches optimized for wireless transmission not only relieves the memory requirements but also allows the Bluetooth module and the GPIB chip to work in parallel, which creates a more continuous flow of data with higher overall throughput.

Figure 6:
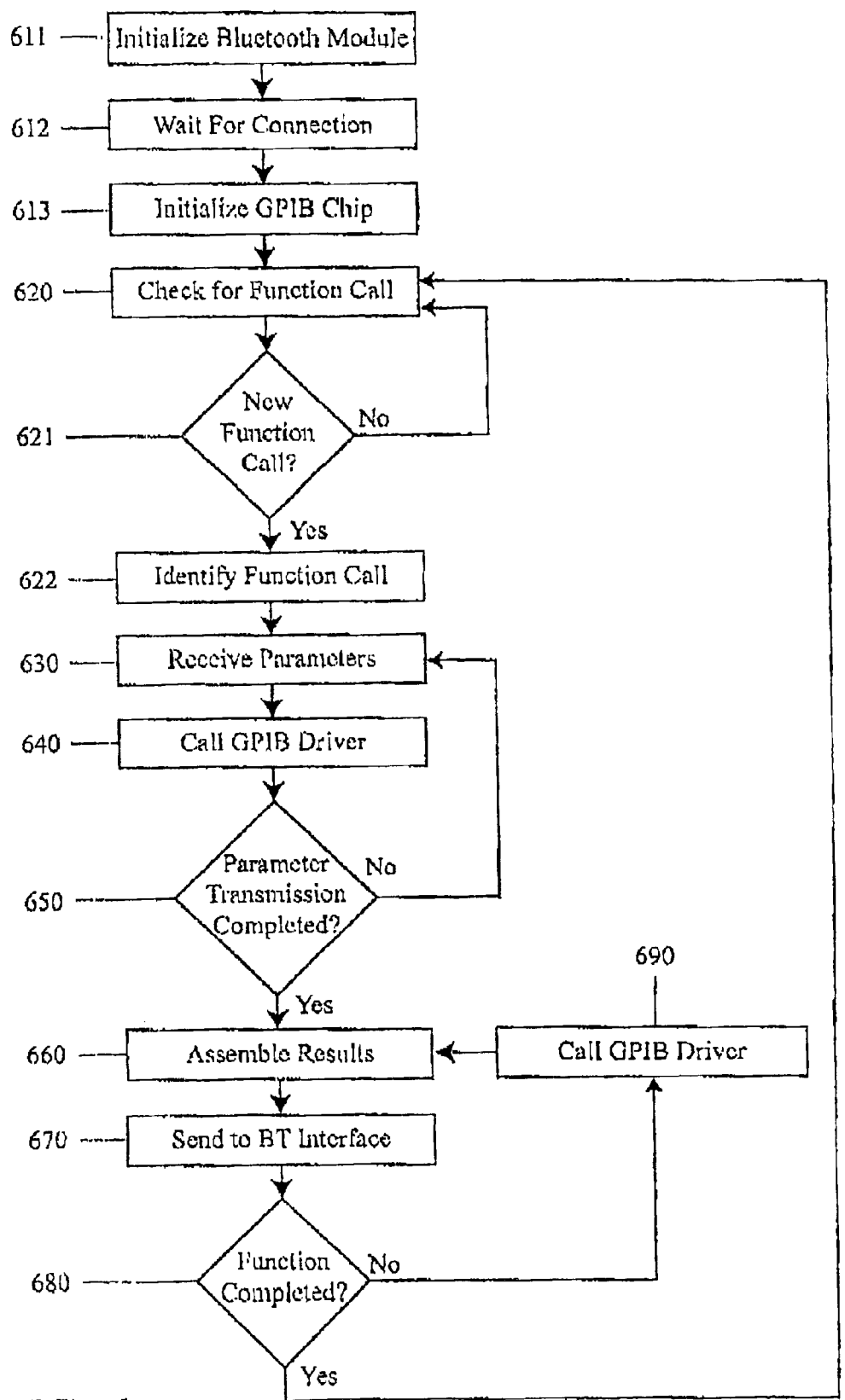
FIG. 6 is a flowchart describing the method according to one embodiment of the invention.
Figure 7:
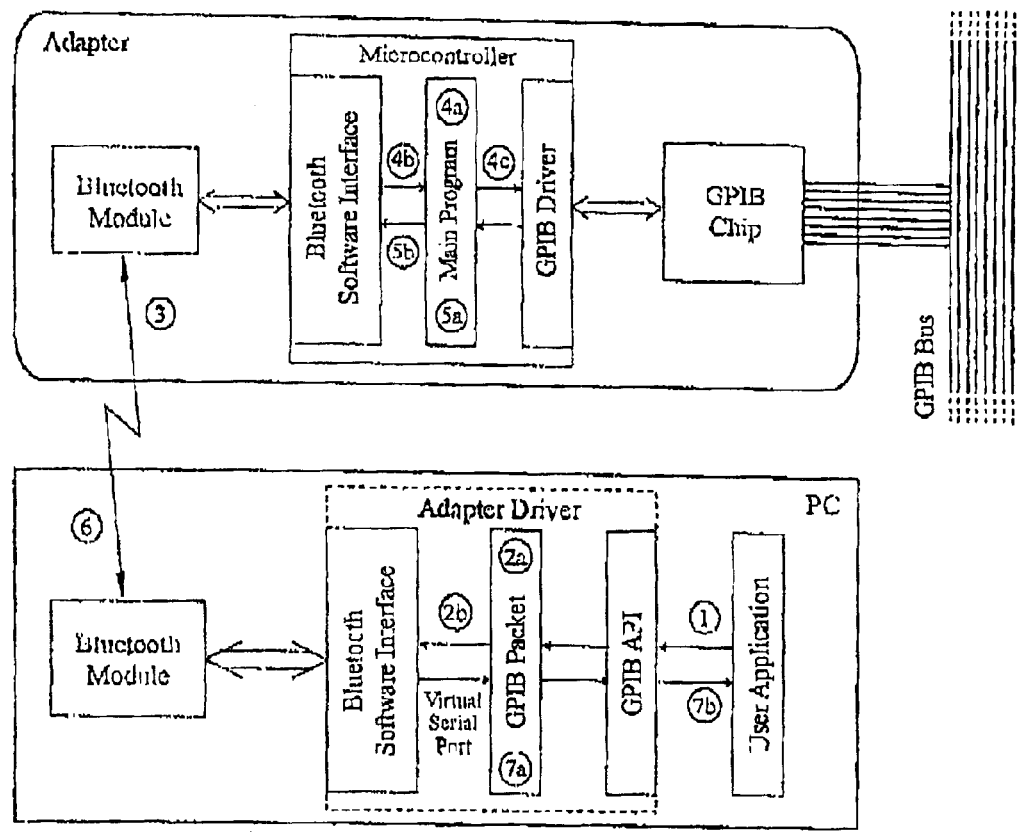
FIG. 7 is a schematic drawing referring to the steps of one embodiment of the method of the invention.

The methods of operation according to the present invention will be described with references to FIGS. 6 and 7. The microcontroller 340 of the adapter 100 controls the GPIB chip 350 and the adapter Bluetooth module 330, by the means of a computer program product executed in the microcontroller. The flowchart of the algorithm describing the operations performed by the adapter is illustrated in FIG. 6 and comprises the following step:

611: Initialize the adapter Bluetooth module 330 to make it accept connections from other Bluetooth devices.
612: Wait until a connection is established with the host computer 120.
613: Initialize the GPIB chip 350. The adapter is now ready to accept and execute function calls from the host computer.
620: Check for incoming function calls from the Bluetooth module.
621: If There is a new function call then continue to 622, otherwise go back to 620.
622: Read the FCN 500 byte of the GPIB Packet 475 to identify the GPIB function call by the use of the stored list of GPIB function calls and their corresponding GPIB packet structures and function call number FCN.
630: Read the parameters from the virtual serial port until the packet GPIB packet 475 is completed or the buffer of microcontroller buffer is full.
640: Call the identified function in GPIB driver 344 with the newly received parameters.

650: If the parameter transmission was completed in 630 then continue to 660. Otherwise return to 630.

660: Assemble the function call return parameters in a GPIB return packet 476 until all return parameters are assembled or the buffer of the microcontroller is full.

670: Transfer the data in the form of GPIB return packets 476 to the virtual serial port of the Bluetooth interface module 342 for further transmission to the computer 120.

680: If all return parameters were assembled in 660 then return to the step of checking for incoming function calls 620. Otherwise continue to 690.

690: Call the identified function in the GPIB driver to assemble more of the return parameters. Continue to 660.

The method according to the present invention of converting and transferring a GPIB function call will be described with reference to FIG. 7. The function call is issued by the user application 190 in the host computer 120 and executed by the adapter 100, e.g. to transfer a command to a GPIB device 200 connected to the GPIB bus 110. Two different kinds of functions are recognized: functions writing data or commands to the bus and functions reading data from the bus. Steps that are specific for writing and reading function calls are marked with prefixes Write and Read, respectively. The method comprises the following steps:

1) The user application 190 calls the function with the required parameters.
2) The function call is processed by the adapter driver 380:
   a) A GPIB packet 475 is assembled containing the function identification number FCN followed by the function parameters in the order determined by the corresponding packet structure. The GPIB packet is assembled according to the list of GPIB function calls and their corresponding GPIB packet structures and function call number FCN, stored in the host computer.
   b) the GPIB packet 475 is transferred to the Bluetooth virtual serial port of the Bluetooth interface module 360.
3) The GPIB packet 475 is wirelessly transmitted from the host computer to the adapter. The Bluetooth software in the host computer and the adapter manage flow control and division of the GPIB packet into possible smaller Bluetooth packages 465. This operation is carried out in parallel with step 4) until the whole GPIB packet has been transmitted.
4) The GPIB packet is received by the main program 346 and the function is executed:
   a) The main program receives the GPIB packet header. The FCN 500 section of the packet is read to identify the function and the packet structure. The identification is preferably performed by the use of the list of GPIB function calls and their corresponding GPIB packet structures and function call number FCN, stored within the adapter memory means.
   b) Data is read from the virtual serial port until all parameters have been received. Write or until the microcontroller buffer is full.
   c) The GPIB driver 344 is called to execute the function with the received parameters.
   d) Write: Step b) and c) are repeated until the complete packet is received.
5) The results are assembled by the main program and returned in a GPIB return packet 476;
   a) Write: The GPIB status and GPIB error variables are assembled to a GPIB packet;
   Read: Result data from the function call are assembled until all data is read or the buffer of the microcontroller is full. If all result data has been read the GPIB status and GPIB error variables and the END character are appended to the GPIB packet.
   b) Data is transferred to the Bluetooth virtual serial port of the adapter.
   c) Read: Step a) and b) are repeated until all result data has been read.
6) The GPIB return packet 476 is wirelessly transmitted from the adapter to the host computer, possibly in parallel with step 5.
7) The GPIB return packet 476 is received by the adapter driver and returned to the user application 190:
   a) Write: The GPIB return packet with known size is read from the virtual serial port;
   Read: Data is read into from the virtual serial port until the END character is received.
   b) The Adapter driver returns the status and error variables (Read: and the result data) to the user application.

The method according to the invention may be further illustrated by the specific example of the GPIB read function, in NI-488.2 denoted IBRD. The GPIB read function is of the read type marked with "Read" in the above general example.

1) The user application calls the function IBRD to read from a device on (one of the) active the GPIB bus(es). Parameters: device address, address to the buffer where the data should be written, and maximum number of bytes to be read.
2) The function call is processed by the adapter driver:
   a) A GPIB_Read packet is assembled containing the function identification number FCN, the device address ADDR, and the maximum number of bytes to be read.
   b) The GPIB_Read packet is sent to the Bluetooth virtual serial port.
3) The GPIB_Read packet is wirelessly transmitted from the host computer to the adapter.
4) The GPIB packet is received by the main program and the function is executed:
   a) The FCN section of the packet is read to identify the IBRD function and the GPIB_Read packet structure.
   b) The remaining parameters of the packet are read from the virtual serial port.
   c) The GPIB driver is called to execute the IBRD function with the received parameters.
5) The results are assembled and returned in a GPIB_Return_Read packet:
   a) Data is read from the addressed GPIB device until the microcontroller buffer is full, or until all data is read, i.e. the maximum number of bytes to read has been reached or the addressed GPIB device signals end of transfer. If all result data has been read the GPIB_STATUS and GPIB_ERROR variables and the END character are appended to the GPIB_Return_Read packet,
   b) Data is sent to the Bluetooth virtual serial port.
   c) Step a) and b) are repeated until all result data has been read.
6) The GPIB packet is wirelessly transmitted from the adapter to the host computer. This step is parallel with step 5) if the size of the result data is bigger than the microcontroller buffer.

7) The GPIB_Return_Read packet is received by the adapter driver and returned to the user application:
   a) Data is read from the virtual serial port until the END character is received.
   b) The adapter driver returns the status and error variables and the device data to the user application.

In the case of multiple adapters 100, as illustrated in FIG. 2b, the parameter which in step 1 is denoted "device address" may alternatively be an interface descriptor. The GPIB device on the corresponding GPIB bus 110 which is to send data is then assumed to already be addressed as Talker.

Figure 8:
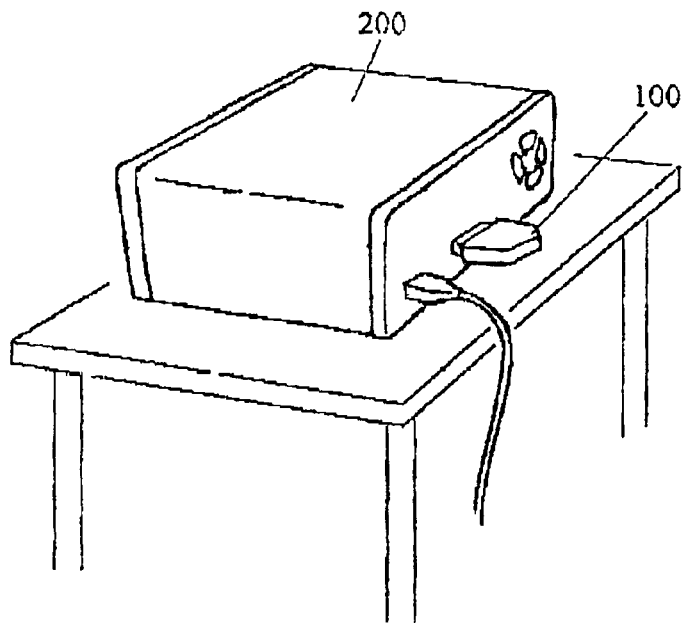
FIG. 8 shows a preferred realization and use of the adapter according to the invention.

The adapter according to the invention is intended for attachment either directly to a GPIB device or through a cable. Alternatively the functionality can be realized in a component for integration within an instrument or other equipment. In a preferred embodiment, illustrated in FIG. 8, the adapter 100 according to the invention is made to be plugged in directly to the GPIB-port of the GPIB device 200. Additional GPIB devices may be connected to the adapter by means of a GPIB cable, or preferably equipped with individual adapters providing increased flexibility.

The adapter (100) according to the present invention has mainly been illustrated as being in communication with a host computer (120). The term host computer (120) should be interpreted to comprise any present or future device cable of performing the data processing necessary for executing the user application 190. Such device includes servers, network access points, PDA's, mobile phones, handheld computers etc.

The method according to the present invention is preferably implemented by means of program products comprising the software code means for performing the steps of the method. The program products are typically executed on the processing unit of the microcontroller 340 and the computer 120, respectively. The computer program is loaded directly or from a computer usable medium, such as a floppy disc, a CD, the Internet etc.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

APPENDIX A

GPIB Packet Structures
This describes the most common GPIB packet types used in the communication.
Description of the variable types in the packets:
uint8    Unsigned integer (8 bits)
uint16   Unsigned integer (16 bits)
uint32   Unsigned integer (32 bits)
char     Character
string   String of characters
MAXSTRLENGTH          Maximum number of data bytes in a packet
Structure             GPIB function in NI-488.2 notation
GPIB_Write            ibwrt
  uint8 FCN
  uint8 ADDR
  uint32 LENGTH
  string DATA
GPIB_Read             ibrd
  uint8 FCN
  uint8 ADDR

APPENDIX A-continued uint32 MAX_BYTES_TO_READ
GPIB_Address                    ibclr, ibpad, ibrsp
  uint8 FCN
  uint8 ADDR
GPIB_Data                       ibsre, ibcac
  uint8 FCN
  uint8 data
GPIB_Command                    ibcmd
  uint8 FCN
  uint32 LENGTH
  string DATA
GPIB_Wait                       ibwait
  uint8 FCN
  uint8 ADDR
  uint16 WAIT_MASK
GPIB_Sic                        ibsic
  uint8 FCN
Return packets:
GPIB_Return_Status              ibwrt, ibcac, ibsre, ibclr, ibgts,
  uint16 GPIB_STATUS            ibpad, ibcmd, ibwait, ibsic
  uint8 GPIB_ERROR
GPIB_Return_Read                ibrd, ibrsp
  string DATA
  uint16 GPIB_STATUS
  uint8 GPIB_ERROR
  char END

What is claimed is:

1. A GPIB adapter adapted for providing wireless communication between at least one GPIB device and at least one computer, the adapter comprising a command handler and a wireless communication module, the command handler adapted for communication with the wireless communication module, wherein the adapter comprises a GPIB control unit, the command handler adapted for executing GPIB function calls directed to the GPIB device through the GPIB control unit, and the command handler comprises a GPIB driver, the GPIB driver adapted for communication with the GPIB control unit, such that GPIB functionality is provided by the adapter.

2. Adapter according to claim 1, wherein the GPIB control unit and the GPIB driver are adapted for providing complete GPIB functionality.

3. Adapter according to claim 1, wherein the GPIB control unit and the GPIB driver are adapted for providing a selection of the GPIB functionality, the selection comprising essential and/or frequently used functions.

4. Adapter according to claim 1 wherein said wireless communication module provides short range radio communication.

5. Adapter according to claim 4, wherein said wireless communication module is a Bluetooth module.

6. Adapter according to claim 4, wherein said wireless communication module is adapted for providing communication with a wireless local area network (W-LAN) or a hyper local area network (Hyper-LAN).

7. Adapter according to claim 1, wherein said wireless communication module provides infra red (IR) communication.

8. Adapter according to claim 1, wherein said command handler is a microcontroller and comprises a Bluetooth interface, a main program and said GPIB driver.

9. Adapter according to claim 1, wherein the adapter, or the functionality of the adapter, is arranged within a GPIB device.

10. A system for providing wireless communication between GPIB units comprising at least one adapter and at least one computer, the adapter comprising a wireless communication module and a command handler, the computer comprising a wireless communication module and a user application wherein an adapter driver is arranged in communication with said user application and said wireless communication module of the computer, and a logical interface is provided between the adapter driver and the command handler.

11. System according to claim 10, wherein said logical interface is provided by GPIB packets, the GPIB packets comprising a section representing a function call number (FCN) which corresponds to a GPIB function call, and the structure of the GPIB packet being adapted to the information carried by the GPIB packet, as for reducing the amount of data wirelessly transmitted.

12. System according to claim 11, wherein said GPIB packets are created by the adapter driver in accordance with a list of GPIB function calls and their corresponding GPIB packet structures and function call number (FCN), the list stored in the host computer.

13. System according to claim 11, wherein a main program of said command handler transforms said GBIP packets to GPIB function calls in accordance with a list of GPIB function calls and their corresponding GPIB packet structures and function call number (FCN), the list stored in memory means of the adapter.

14. System according to claim 10, wherein said communication module of the adapter and said wireless communication module of the computer are Bluetooth modules.

15. Method of, in a GPIB adapter, receiving and executing a GPIB function call, the method comprising the steps of:
  checking for incoming function calls from a wireless communication module;
  receiving a GPIB Packet comprising the parameters of a GPIB function call;
  identifying from the GPIB packet, the GPIB function call by the use of a stored list of GPIB function calls and their corresponding GPIB packet structures and function call number FCN;
  calling the identified function in GPIB driver;
  assembling the result from the function call in a GPIB return packet; and
  transmitting the result in the format of GPIB packets via the wireless communication module.

16. A computer program product directly loadable into an internal memory of a processing means with an adapter, comprising software code means adapted for controlling the steps of claim 15.

17. A computer program product stored on a computer usable medium, comprising readable program adapted for causing a processing means in a processing unit for image processing, to control an execution of the steps of claim 15.

18. Method of wirelessly transmitting and executing a GPIB function call, the method comprising the steps of:
  calling from a user application, executed in a host computer, a GPIB function call;
  assembling in an adapter driver of the host computer, a GPIB packet comprising a function identification number FCN and function parameters, the GPIB packet assembled according to a first list of GPIB function calls and their corresponding GPIB packet structures and function call number FCN, the first list stored in the host computer;
  transmitting the GPIB packet from, the host computer to an adapter;
  receiving the GPIB Packet in the adapter;
  identifying from the GPIB packet, the GPIB function call by the use of a second list of GPIB function calls and their corresponding GPIB packet structures and function call number FCN, the second list stored in the adapter;
  calling the identified function in a GPIB driver;
  assembling the result or part of the result from the function call in a GPIB return packet; and
  transmitting the GPIB return packet from the adapter to the host computer.

19. Computer program products directly loadable into an internal memory of a processing means within an adapter and a computer, respectively, comprising software code means adapted for controlling the steps of claim 18.

20. A computer program product stored on a computer usable medium, comprising readable program adapted for causing a processing means in a processing unit for image processing, to control an execution of the steps of claim 18.

* * * * *